United States Patent [19]

Young

[11] 4,102,789
[45] Jul. 25, 1978

[54] HYDRO-CARPET OIL SPILLAGE CONTAINMENT AND RECOVERY DEVICE

[75] Inventor: Richard W. Young, Edison, N.J.

[73] Assignee: Amerada Hess Corporation, Woodbridge, N.J.

[21] Appl. No.: 816,570

[22] Filed: Jul. 18, 1977

Related U.S. Application Data

[63] Continuation of Ser. No. 747,679, Dec. 6, 1976, abandoned, which is a continuation of Ser. No. 572,538, Apr. 28, 1975, abandoned.

[51] Int. Cl.$^2$ .............................................. C02B 9/02
[52] U.S. Cl. ......................... 210/252 AS; 210/242 S; 210/DIG. 26; 210/DIG. 25; 61/1 F
[58] Field of Search ..... 210/242 S, 242 AS, DIG. 25, 210/DIG. 26, 40; 61/1 F

[56] References Cited

U.S. PATENT DOCUMENTS

| | | | |
|---|---|---|---|
| 2,682,151 | 6/1954 | Simpson et al. | 61/1 F |
| 3,146,598 | 9/1964 | Smith | 61/1 F |
| 3,539,013 | 11/1970 | Smith | 210/242 AS |
| 3,563,036 | 2/1971 | Smith et al. | 61/1 F |
| 3,607,741 | 9/1971 | Sohnius | 210/242 AS |

Primary Examiner—Frank A. Spear, Jr.
Assistant Examiner—Benoit Castel
Attorney, Agent, or Firm—Arthur A. March

[57] ABSTRACT

A hydro-carpet apparatus for providing for downstream containment and recovery of contaminants of oil spills and the like resulting from overflows when making a transfer of such oil materials between a floating vessel and storage means, with the transfer occurring after the vessel is brought substantially adjacent to the dock surface, in which the hydro-carpet is removably maintained in compact form, e.g. on a roller, in a container, and means are secured to one end of the hydro-carpet for securing that one end to the dock while the hydro-carpet is still in the container, and further means are secured to the other end of the hydro-carpet for securing that other end to the downstream end of the vessel also while the hydro-carpet is still in the container, so that the hydro-carpet can be manually rapidly removed from the container by one person pulling on the further means and, after removal and while still being so secured, in turn rapidly dropped onto and be dispensed across the surface upon which the vessel is floated, thereby to preclude contaminants resulting from losses during transfer from floating over the surface beyond the dock and the region where the hydro-carpet is secured to the vessel.

3 Claims, 7 Drawing Figures

U.S. Patent  July 25, 1978  Sheet 2 of 2  4,102,789
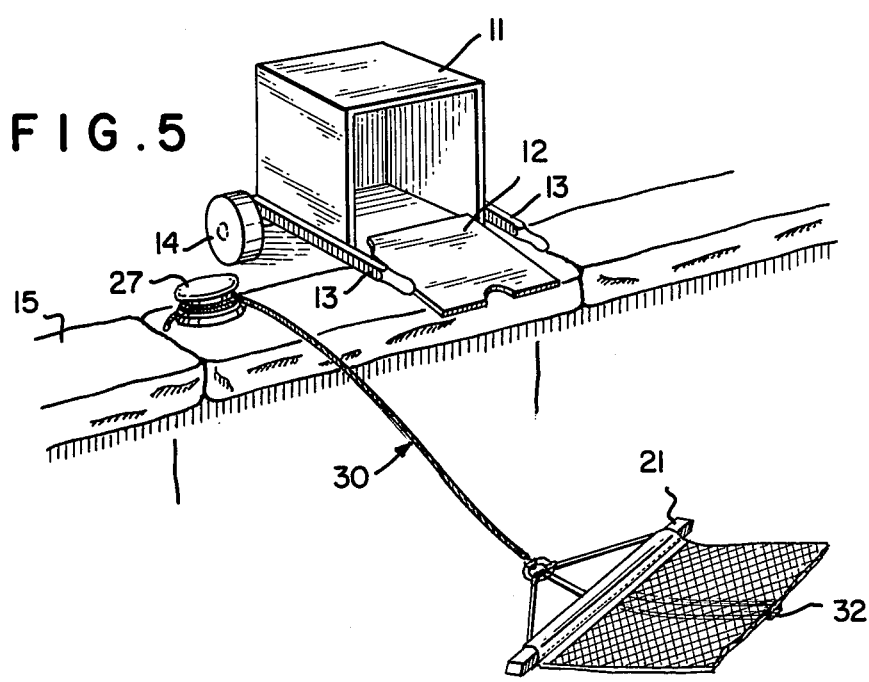
FIG. 5
FIG. 6
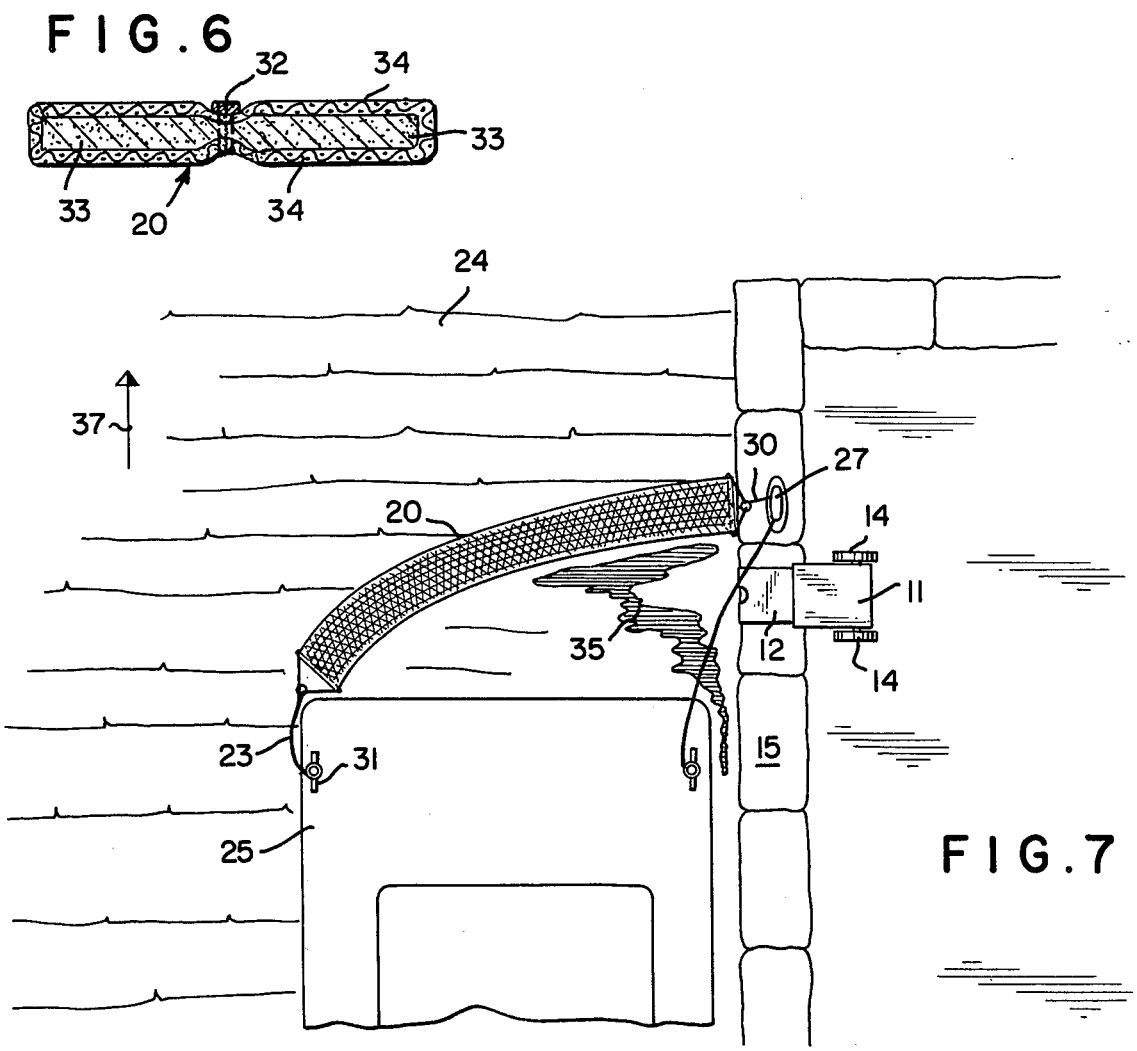
FIG. 7

HYDRO-CARPET OIL SPILLAGE CONTAINMENT AND RECOVERY DEVICE

This is a continuation of copending application Ser. No. 747,679, filed Dec. 6, 1976, which in turn is a continuation of copending application Ser. No. 572,538, filed Apr. 28, 1975, both now abandoned.

This invention relates to hydro-carpet apparatus. This apparatus is primarily for providing an emergency containment potential for small oil spills. These spills may result from transferring petroleum products either from a land based supply on shore to a vessel or vice versa.

The invention is to preclude the possibility of any spills which may result from such transference from extending beyond a limited region of the water surface about the vessel to which the petroleum product is to be transferred or from which it is to be removed. It is, in this way, possible to preclude contamination of large areas of any water body in which the vessel is floated and thus prevent the damages that could otherwise result.

The invention is so arranged that its components can be positioned and placed in a usable state by a single workman without the assistance of additional personnel or by the use of any mechanical equipment.

In its exemplified form, the invention comprises a wheeled container which is placed substantially at the edge of a dock or bulkhead down current from the point at which the transfer is to take place between the land-based supply and the vessel or vice versa. To achieve this result, it is usually desirable to provide a line from the end of the rolled carpet leading from the bottom of the container to a cleat on the dock or bulkhead at a mark indicating the approximate distance from the loading device to the water. A messenger line attached to a "U" shaped yoke is then led across the water and secured to the outer portion or deck of the vessel prior to any product transference during the indicated transfer operations. The arrangement is so conceived that in the event of a spill the messenger line is pulled smartly, thus tripping the container door and, from this, making it possible to release a carpet roll previously stored in the container so that it can be almost instantly pulled out of the container in such fashion that it falls to the water surface after being unreeled. The carpet contained within the container is formed of sorbent material which will temporarily contact and contain, as well as either adsorb or absorb oil products up to and including a rather free floating oil, illustratively, a number 4 oil.

As the invention is conceived the mesh of the carpet will trap and hold even a heavier oil and thus make possible the full containment and recovery capability for the full range of any petroleum products to be loaded upon the vessel from a land-based supply or to be unloaded from the vessel to a similarly based land container.

The invention has for its principal object that of providing ways and means by which it is possible to contain any oil spills from a supply during transference between a vessel moved adjacent to a docking area and an oil container on the dock surface, so that, in the event of spillage, any spilled products will be held within a limited bounding area of the vessel to preclude their floating over wide areas of the water medium in which the vessel is floating.

Other objects of the invention are those of providing a simple structure and components for achieving the containment of petroleum products in the transfer between land and a floated vessel, which arrangement and formation of components is visually brought into use only at times when spillage results, or is even expected.

Another object of the invention is to provide a structure which contains a carpet which is released and removed to cover a limited area surrounding the vessel to which the petroleum is transferred when overflow or leakage results and in which case the extent of overflow or leakage can be nullified readily with a control exercised from the moored vessel.

Other and further objects of the invention will become apparent from consideration of the following description read in connection with the accompanying drawings wherein:

FIG. 5 shows the carpet unrolled, with the holder of FIG. 4 not shown and the carpet shown in part only in a position dropped to the water surface;

FIG. 6 is a sectional view taken along the line 6—6 of FIG. 5 showing the general carpet structure;

FIG. 7 is a schematic plan view to show the carpet unrolled and fastened between the vessel and the dock surface in a direction down stream of the vessel in a manner to catch any oil spills as they are schematically represented by the shaded area.

Figure 1:
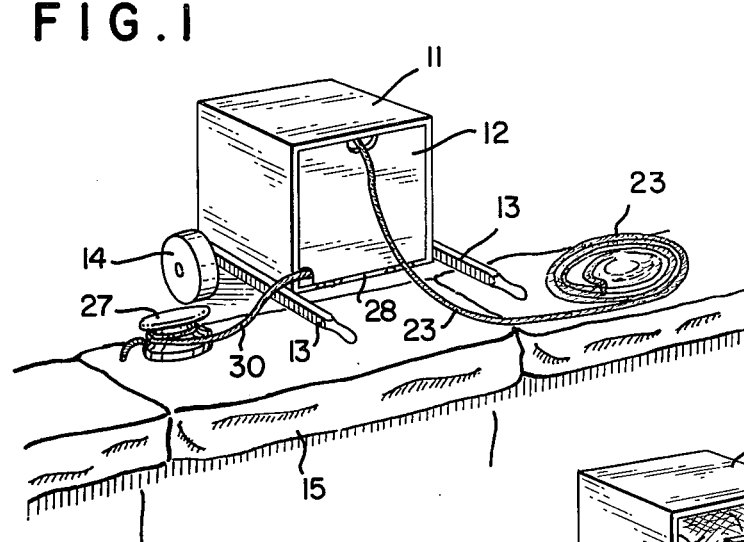
FIG. 1 is a showing of a container holding a reel of a carpet material to catch a hydro carpet or petroleum component when the carpet is removed and placed about the vessel during a transference of the petroleum products between a land base and a vessel or vice versa.
Figure 2:
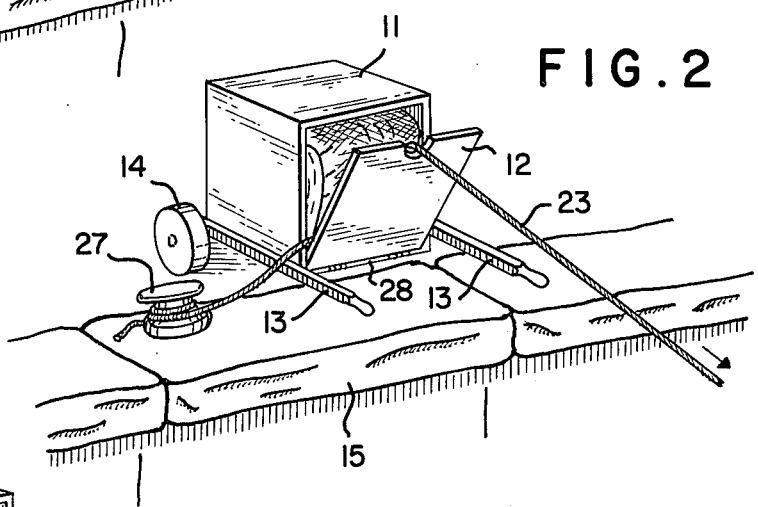
FIG. 2 is a view similar to FIG. 1, except to show the use of a messenger line running between the land base and the vessel to open the container for the release of the hydro-carpet.
Figure 3:
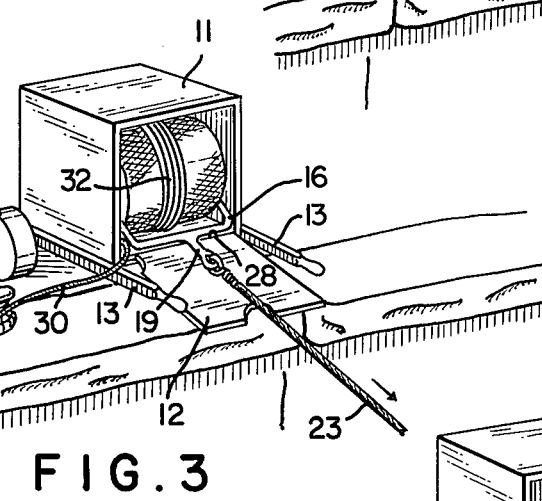
FIG. 3 is a similar view showing the container in which the hydro-carpet reel is contained, in an open position so that the carpet reel may be released.

Now making reference to the drawings, FIG. 1 shows a carpet holding container 11 with a front door structure 12 arranged to be pivoted about its front lower edge. The container is preferably movable to an unloading position by means of extension rods and hand grips 13 and wheels 14 so that it may be brought substantially to the edge 15 of a dock area. There is positioned within the container a supporting structure 16 of a generally U-shaped formation with inwardly projecting members 17 extending toward each other from the open end of the U-shaped structure. A hydro-carpet 20 of the general form schematically shown by FIG. 6 is adapted to be maintained in compact form in the container. As shown for illustrative purposes, it is rolled in such fashion as to be held about the U-shaped supporting members on a roller 36 and rolled about the inwardly extending portions 17 to form it into a roll 18 of the general character indicated by FIG. 4.

Figure 4:
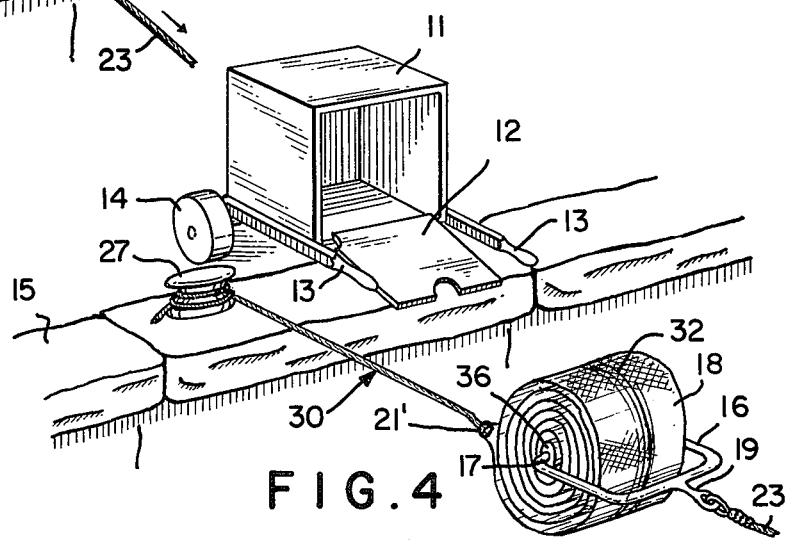
FIG. 4 shows the hydro-carpet holder released from the container and ready for dropping to the water surface to contain any spillage, with the Figure showing the hydro-carpet reeled and not yet unrolled position.

One end of the carpet 20 is attached to a clamping structure 21 preferably of the general character shown by FIG. 5 and schematically illustrated at 21' in FIG. 4. This clamping structure 21 clamps the end of the hydro-carpet 20 in such a fashion that it may be unreeled with a pull upon the line 30 attached to the clamp 21 and then released in the fashion shown by FIG. 5 to be led or rested upon the surface of the water body 24 on which a vessel is floated, with the vessel here being illustrated schematically as to its deck area 25. The vessel is so disposed for the transfer of materials such as oil from the vessel to storage means or the like (not shown).

The hydro-carpet is held within the container 11 until the door 12 is opened. To open the door, the U-shaped holder member 16 is attached through a projection 19 to a messenger line 23 which in normal use is extended between the docking region 15 and the vessel deck 25 and fastened about a cleat 31 as schematically illustrated in FIG. 7.

In the event of spill of any petroleum product being passed between the messenger line and the dock area on which the container 11 is held, the messenger line 23 is pulled in the direction of the indicated arrows and when so pulled the door 12 of the container which is pivoted about its lower edge 28 opens to permit the rolled carpet 18 to be removed from the container with any further pull.

The line 30 fastened to the end of the carpet 20 at clamp 21 has been fastened about a cleat, such as 27, on the dock.

Thus, by pulling the messenger line 23, the carpet roll, i.e. including carpet 20 and roller 36, is withdrawn from the container 11, and is lowered to rest on the surface of the water 24. The line 30 holds the end of the carpet 20 in place, and continued pulling on messenger line 23 causes the roller 36 to be pulled along the water surface and the carpet to be unrolled, i.e. incrementally or progressively dispensed or paid out, from roller 36 and onto and across the surface of the water in which the vessel is floated so as then to rest on the water surface, such as is indicated by FIGS. 4, 5 and 7.

In this instance, it should be noted that the carpet 20 is formed from a sorbent central portion 33. This is covered by a mesh region 34 on either side. Thus, the carpet is either adsorbent or absorbent and will temporarily contain, for a reasonable time adsorbed oil products up to and including a rather viscous oil so that it can trap and hold this oil product from floating downstream. The carpet, of course, must have a containment and recovery capability for a full range of oil products so that after adsorbing the oil that is spilled it can later be secured or compressed to such an extent that the oil adsorbed is removed therefrom. As shown the carpet 20 is provided through its central portion with a container strap 32 to maintain the configuration of the carpet.

For a condition where there has been spillage of oil, the oil is conventionally represented in FIG. 7 by the shaded area 35 on the inner surface 24. Due to the assumed down stream position relative to oil transfer, the flow of the water is represented by the arrow 37, the spillage will be picked up by the hydro-carpet so as thereby to be restricted to a minimal area or surface of the water within the region adjacent to the vessel and the docking surface.

From the foregoing it will be apparent that various modifications may be made provided the essential features including a hydro-carpet of the general nature described in FIG. 6 is included and provisions are made for extending that carpet to the docking area around the vessel on the down stream side thereof so that flow of the water will cause the spillage to flow in the direction of the hydro carpet for adsorption in that region. Accordingly, the invention is to be understood in its broad sense and such modifications as fall fairly within the spirit and scope of the hereinafter appended claims shall be considered as within the disclosure here made.

What is claimed is:

1. A hydro-carpet apparatus for providing for the downstream containment and recovery of contaminants of oil spills and the like resulting from overflows when making a transfer of such oil materials between a floating vessel and storage means, with the transfer occurring after the vessel is brought substantially adjacent to a dock surface, said apparatus comprising:

a compactly storable and manually pullable and incrementally dispensable elongate floatable hydro-carpet for the downstream containment and recovery of contaminants of oil spills and permitting emergency deployment by only one person;

a manually pullable roller for maintaining said hydro-carpet in compact form and adapted to be turned under manual pulling force by only one person so that the hydro-carpet may be manually rapidly unrolled therefrom;

a container having an opening closed by an openable door and containing said hydro-carpet manually rapidly removably maintained therein in compact form on said roller, said door being pivotably operable by the force exerted by the outward removal thereat of the hydro-carpet and roller together from the container under manual pulling force by only one person;

a docking securing line secured to one end of said hydro-carpet for securing said one end of the hydro-carpet to the dock while the hydro-carpet is still maintained in compact form in said container, and a vessel securing elongated manually pullable messenger line secured operatively to the other end of said hydro-carpet through said roller for securing said other end of the hydro-carpet to the downstream end of the vessel and of sufficient length for such securing while the hydro-carpet is still maintained in compact form on said roller in said container, so that the hydro-carpet and roller can be manually rapidly removed from the container and dropped together onto the surface upon which the vessel is floated by manually pulling on the messenger line by only one person and so that the hydro-carpet, after removal and while still being so secured, can in turn be rapidly unrolled from the roller on the surface upon which the vessel is floated and simultaneously be incrementally dispensed across such surface by further manual pulling on such messenger line by only one person, thereby to preclude thereat contaminants resulting from losses during the transfer from floating over the surface beyond the dock and the region where the hydro-carpet is secured to the vessel;

a yoke for operatively carrying the roller, said messenger line being secured to the roller through the yoke for pulling the roller via the yoke along the surface upon which the vessel is floated to unroll the hydro-carpet onto and across such surface as the roller is pulled along such surface.

2. Apparatus according to claim 1 wherein the container is portable.

3. Apparatus according to claim 8 wherein said yoke is "U" shaped.

* * * * *